No. 882,083.
PATENTED MAR. 17, 1908.
A. B. VANES.
LETTER COPYING DEVICE.
APPLICATION FILED JUNE 4, 1907.
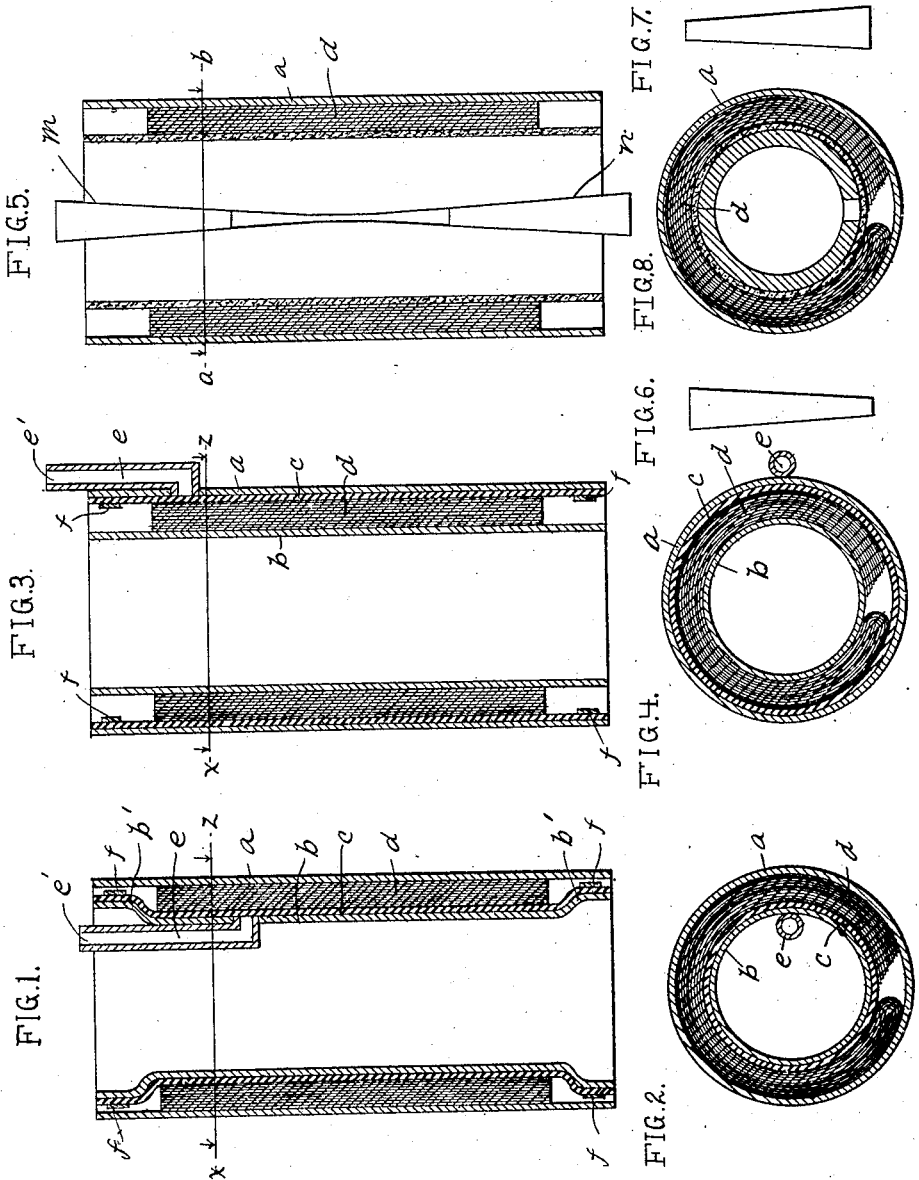
WITNESSES
INVENTOR
Arthur B. Vanes.
BY
ATTORNEYS.

UNITED STATES PATENT OFFICE.

ARTHUR BAYLY VANES, OF UITENHAGE, CAPE COLONY.

LETTER-COPYING DEVICE.

No. 882,083.  Specification of Letters Patent.  Patented March 17, 1908.

Application filed June 4, 1907. Serial No. 377,152.

*To all whom it may concern:*

Be it known that I, ARTHUR BAYLY VANES, a subject of the king of Great Britain, and residing at Uitenhage, in the district of Uitenhage and Colony of the Cape of Good Hope, have invented certain new and useful Improvements in Letter-Copying Devices, of which the following is a specification, such as will enable those skilled in the art to which it appertains to make and use the same.

The object of this invention is to provide an improved device for copying letters which is at the same time portable.

The invention is fully described in the following specification of which the accompanying drawings form a part and in which:—

Figure 1 is a vertical section, Fig. 2 a transverse section of Fig. 1 on the line X Z, Figs. 3 and 4 are similar views of a modification, and Figs. 5, 6, 7 and 8 refer to another modification.

In these views $a$ represents an outer tube, $b$ an inner tube, both of brass or other suitable material; $c$ a thin rubber tube; $d$ a flexible letter copying book containing the letters &c. to be copied arranged in the usual way, $e$ a small tube soldered to the inner tube $b$ or, in the modification shown in Figs. 3 and 4, to the outer tube $a$ and so arranged that an ordinary inflating pump such as used on bicycle tires can be attached to the free end $e'$, $ff$ are sections of bands used for securing the rubber tube.

The ends $b'$ $b'$ of the inner tube may be expanded as shown in Fig. 1 and over the ends expanded or plain, the rubber tube is attached in the usual way by bands $ff$ (or by wire) so as to make air tight joints with the ends $b'$ $b'$ of the inner tube.

In the modified form of Figs. 3 and 4 the rubber tube is attached by bands $ff$ to the inside of the outer tube $a$.

It will be evident that if an inflating pump such as used for cycle tires be attached to $e'$, the rubber tube will be dilated by its action. to use the device a flexible copying book $d$ with the letters to be copied arranged as usual is wrapped round the rubber tube $c$ which is then placed inside the outer tube $a$ and the rubber tube is then inflated through $e$. The requisite pressure is thus obtained for copying the letters. When this has been accomplished, the rubber tube can be deflated and the copying book etc. withdrawn. If a sheet of paper or tin large enough to be wrapped round the whole of the inner tube and copying book be so used the subsequent withdrawal is facilitated.

The device may be oval, oblong, square or nearly flat in section instead of circular as shown. The inner tube B may be dispensed with if the ends of the rubber tube be closed by suitable disks and the tube $e$ be attached to the rubber tube or to one of the disks. In the interior of the inner tube the pump, writing material etc. may be packed away.

In the modification shown in Figs. 3 and 4 the rubber tube is dilated upon the copying book wrapped round the inner tube and the necessary pressure applied as before.

Instead of dilating the rubber tube pneumatically as just described, the inner tube may be made of wood with a vertical slit as shown in Figs. 5 and 8 where Fig. 5 is a side view showing the split which has its ends $m$ and $n$ tapered as shown and Fig. 8 a transverse section on the line A B. When the copying book, duly arranged, has been introduced into the outer tube, the wedges shown in Figs 6 and 7 are introduced into $m$ and $n$ respectively and pressed or driven in. By these means the split tube is expanded and the necessary pressure effected. Instead of using a rubber tube one of felt, glued to the outside of the split tube and split itself correspondingly, may in this modification be substituted.

Having thus described my invention, what I claim as new and desire to protect by Letters Patent is the following:—

1. A copying device of the class described, comprising two tubes one of which is of less diameter than the other and adapted to be placed therein, the space between said tubes being adapted to receive a copying book, and means for applying pressure to said copy book when placed between said tubes.

2. A copying device of the class described, comprising two tubes one of which is of less diameter than the other and adapted to be placed therein, a rubber tube adapted to be placed between the first named tubes, the space between said tubes being also adapted to receive a copy book, and means for supplying pressure between the rubber tube and the other tube adjacent to which it is placed when the copy book is in position.

In testimony that I claim the foregoing as my invention I have signed my name in presence of the subscribing witnesses this 29th day of April, 1907.

ARTHUR BAYLY VANES.

Witnesses:
EMILY BLANCHE VANES,
CHARLES PIENAAR.